(12) United States Patent
Senatore et al.

(10) Patent No.: US 8,876,283 B2
(45) Date of Patent: *Nov. 4, 2014

(54) HINGE MECHANISM FOR A FLUID FILLED LENS ASSEMBLY

(71) Applicant: Adlens Beacon, Inc., Pembroke Park, FL (US)

(72) Inventors: Daniel Senatore, San Francisco, CA (US); Matthew Wallace Peterson, San Francisco, CA (US); Jonathan Downing, Belmont, CA (US); Amitava Gupta, Roanoke, VA (US); William Egan, Jackson, WY (US); Lisa Nibauer, Short Hills, NJ (US); Frank Stangota, Bridgewater, NJ (US); Bruce Decker, Solebury, PA (US); Thomas M. McGuire, Princeton, NJ (US); Urban Schnell, Münchenbuchsee (CH); Karim Haroud, Chavannes sur Moudon (CH); Pascal Loser, Bern (CH)

(73) Assignee: Adlens Beacon, Inc., Pembroke Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,780

(22) Filed: Jan. 11, 2013

(65) Prior Publication Data
US 2013/0308088 A1  Nov. 21, 2013

Related U.S. Application Data

(63) Continuation of application No. 12/904,769, filed on Oct. 14, 2010, now Pat. No. 8,353,593.

(60) Provisional application No. 61/251,819, filed on Oct. 15, 2009.

(51) Int. Cl.
*G02C 1/00* (2006.01)
(Continued)

(52) U.S. Cl.
CPC .. *G02C 7/08* (2013.01); *G02B 3/14* (2013.01); *G02C 5/22* (2013.01); *G02C 5/14* (2013.01); *G02C 5/001* (2013.01)
USPC .............................. 351/158; 351/49; 351/121

(58) Field of Classification Search
USPC ............. 351/158, 41, 49, 159, 161, 168, 169, 351/121; 359/665, 666
See application file for complete search history.

(56) References Cited

U.S. PATENT DOCUMENTS

| 2,576,581 A | 11/1951 | Edwards |
| 2,836,101 A | 5/1958 | De Swart |

(Continued)

FOREIGN PATENT DOCUMENTS

| CN | 1216083 A | 5/1999 |
| CN | 2682432 Y | 3/2005 |
| WO | WO 2008/063442 A1 | 5/2008 |

OTHER PUBLICATIONS

Borish, I.M., *Clinical Refraction*, 3rd Edition, Chapter 26 (pp. 1051-1113), The Professional Press, Inc., Chicago (1970).

(Continued)

*Primary Examiner* — Hung Dang
(74) *Attorney, Agent, or Firm* — Greenberg Traurig, LLP

(57) ABSTRACT

In an embodiment, a hinge for a fluid-filled lens assembly includes a base having a first end configured to connect to a temple arm of the lens assembly and a second end configured to connect to a frame of the lens assembly, wherein the base includes a gap that is shaped to allow for tubing to pass from the first end to the second end of the base. In an embodiment, the first end of the base includes a cammed surface configured to engage a surface of the temple arm. In an embodiment, the first and second ends of the base are configured to flex around a rotation axis of the hinge.

7 Claims, 23 Drawing Sheets

(51) Int. Cl.

| | |
|---|---|
| *G02B 3/14* | (2006.01) |
| *G02C 7/08* | (2006.01) |
| *G02C 5/22* | (2006.01) |
| *G02C 5/14* | (2006.01) |
| *G02C 5/00* | (2006.01) |

(56) References Cited

U.S. PATENT DOCUMENTS

| | | |
|---|---|---|
| 2,976,766 A | 3/1961 | Bianchi |
| 3,598,479 A | 8/1971 | Wright |
| 3,614,215 A | 10/1971 | Mackta |
| 4,181,408 A | 1/1980 | Senders |
| 4,477,158 A | 10/1984 | Pollock et al. |
| 4,890,903 A | 1/1990 | Treisman et al. |
| 4,913,536 A | 4/1990 | Barnea |
| 5,080,476 A | 1/1992 | Monin |
| 5,138,494 A | 8/1992 | Kurtin |
| 5,182,585 A | 1/1993 | Stoner |
| 5,229,885 A | 7/1993 | Quaglia |
| 5,371,629 A | 12/1994 | Kurtin et al. |
| 5,440,357 A | 8/1995 | Quaglia |
| 5,515,203 A | 5/1996 | Nye |
| 5,563,528 A | 10/1996 | Diba et al. |
| 5,574,598 A | 11/1996 | Koumura et al. |
| 5,636,368 A | 6/1997 | Harrison et al. |
| 5,668,620 A | 9/1997 | Kurtin et al. |
| 5,684,637 A | 11/1997 | Floyd |
| 5,719,397 A | 2/1998 | Hallett et al. |
| 5,731,909 A | 3/1998 | Schachar |
| 5,739,959 A | 4/1998 | Quaglia |
| 5,774,273 A | 6/1998 | Bornhorst |
| 5,790,882 A | 8/1998 | Silver et al. |
| 5,900,921 A | 5/1999 | Min |
| 5,952,846 A | 9/1999 | Silver |
| 5,956,183 A | 9/1999 | Epstein et al. |
| 5,963,048 A | 10/1999 | Harrison et al. |
| 5,973,852 A | 10/1999 | Task |
| 5,999,328 A | 12/1999 | Kurtin et al. |
| 6,040,947 A | 3/2000 | Kurtin et al. |
| 6,053,610 A | 4/2000 | Kurtin et al. |
| 6,069,742 A | 5/2000 | Silver |
| 6,091,892 A | 7/2000 | Xue et al. |
| 6,168,341 B1 | 1/2001 | Chene et al. |
| 6,188,525 B1 | 2/2001 | Silver |
| 6,246,528 B1 | 6/2001 | Schachar |
| 6,493,151 B2 | 12/2002 | Schachar |
| 6,552,860 B1 | 4/2003 | Alden |
| 6,618,208 B1 | 9/2003 | Silver |
| 6,626,532 B1 | 9/2003 | Nishioka et al. |
| 6,715,876 B2 | 4/2004 | Floyd |
| 6,836,374 B2 | 12/2004 | Esch et al. |
| 6,930,838 B2 | 8/2005 | Schachar |
| 6,992,843 B2 | 1/2006 | Juhala |
| 7,068,439 B2 | 6/2006 | Esch et al. |
| 7,085,065 B2 | 8/2006 | Silver |
| 7,142,369 B2 | 11/2006 | Wu et al. |
| 7,256,943 B1 | 8/2007 | Kobrin et al. |
| 7,261,736 B1 | 8/2007 | Azar |
| 7,324,287 B1 | 1/2008 | Gollier |
| 7,325,922 B2 | 2/2008 | Spivey |
| 7,338,159 B2 | 3/2008 | Spivey |
| 7,342,733 B2 | 3/2008 | Takei |
| 7,369,321 B1 | 5/2008 | Ren et al. |
| 7,382,544 B2 | 6/2008 | Cernasov |
| 7,423,811 B2 | 9/2008 | Silver |
| 7,440,193 B2 | 10/2008 | Gunasekaran et al. |
| 7,453,646 B2 | 11/2008 | Lo |
| 7,475,985 B2 | 1/2009 | Blum et al. |
| 7,580,195 B2 | 8/2009 | Choi et al. |
| 7,580,197 B2 | 8/2009 | Omura et al. |
| 7,594,726 B2 | 9/2009 | Silver |
| 7,604,349 B2 | 10/2009 | Blum et al. |
| 8,087,778 B2 | 1/2012 | Gupta et al. |
| 8,353,593 B2 * | 1/2013 | Senatore et al. ............... 351/158 |
| 2004/0240076 A1 | 12/2004 | Silver |
| 2005/0140922 A1 | 6/2005 | Bekerman et al. |
| 2006/0066808 A1 | 3/2006 | Blum et al. |
| 2006/0077562 A1 | 4/2006 | Silver |
| 2006/0164731 A1 | 7/2006 | Wu et al. |
| 2006/0245071 A1 | 11/2006 | George et al. |
| 2006/0250699 A1 | 11/2006 | Silver |
| 2007/0030573 A1 | 2/2007 | Batchko et al. |
| 2007/0211207 A1 | 9/2007 | Lo et al. |
| 2008/0002150 A1 | 1/2008 | Blum et al. |
| 2008/0007689 A1 | 1/2008 | Silver |
| 2008/0008600 A1 | 1/2008 | Silver |
| 2008/0019015 A1 | 1/2008 | Fernandez et al. |
| 2008/0084532 A1 | 4/2008 | Kurtin |
| 2008/0112059 A1 | 5/2008 | Choi et al. |
| 2008/0218873 A1 | 9/2008 | Batchko et al. |
| 2008/0231963 A1 | 9/2008 | Batchko et al. |
| 2008/0285143 A1 | 11/2008 | Batchko et al. |
| 2008/0316587 A1 | 12/2008 | Tijburg et al. |
| 2009/0021843 A1 | 1/2009 | Obrebski et al. |
| 2009/0052049 A1 | 2/2009 | Batchko et al. |
| 2009/0086331 A1 | 4/2009 | Gunasekaran et al. |
| 2009/0116118 A1 | 5/2009 | Frazier et al. |
| 2009/0128922 A1 | 5/2009 | Justis et al. |
| 2009/0195882 A1 | 8/2009 | Bolle et al. |
| 2009/0213471 A1 | 8/2009 | Silver et al. |
| 2009/0251792 A1 | 10/2009 | Suzuki et al. |
| 2010/0045930 A1 | 2/2010 | Silver et al. |
| 2010/0053543 A1 | 3/2010 | Silver et al. |
| 2010/0208194 A1 | 8/2010 | Gupta et al. |
| 2010/0208195 A1 | 8/2010 | Gupta et al. |

OTHER PUBLICATIONS

European Search Report Based on Application No. EP 10824194.4, Dated Jan. 30, 2013.

Gupta, A. et al., U.S. Appl. No. 12/579,203, filed Oct. 14, 2009, entitled "Aspheric Fluid Filled Lens Optic."

Gupta, A. et al., U.S. Appl. No. 12/848,910, filed Aug. 2, 2010, entitled "Non-Round Fluid Filled Lens Optic."

Gupta, A. et al., U.S. Appl. No. 12/855,465, filed Aug. 12, 2010, entitled "Fluid-Filled Lenses and their Opthalmic Applications."

Gupta, A. et al., U.S. Appl. No. 12/904,736, filed Oct. 14, 2010, entitled "Fluid Filled Lens Reservoir System and Manufacturing Method of the Reservoir System."

International Search Report and Written Opinion, dated Dec. 9, 2010, for PCT Appl. No. PCT/US2010/052910, 11 pages.

Jalie, M., *The Principles of Ophthalmic Lenses*, 4th Edition, Chapter 18 (pp. 413-468), The Association of Dispensing Opticians, Hazell Watson & Viney Limited, London (1984).

Markoff, J., "Scientists At Work: Stephen Kurtin—Making Eyeglasses That Let Wearers Change Focus on the Fly," *The New York Times*, 3 pages (Aug. 4, 2009).

Senatore, D. et al., U.S. Appl. No. 12/904,720, filed Oct. 14, 2010, entitled "Fluid Filled Lenses and Mechanisms of Inflation Thereof."

Senatore, D. et al., U.S. Appl. No. 13/000,887, filed Dec. 22, 2010, entitled "Fluid Filled Lenses and Mechanisms of Inflation Thereof."

Tang, S.K.Y. et al., "Dynamically Reconfigurable Liquid-Core Liquid-Cladding Lens in a Microfluidic Channel," *Lab on a Chip*, vol. 8, No. 3, p. 395-401 (Mar. 2008).

European Search Report Based on Application No. EP 10824198.5, Dated Feb. 4, 2013.

International Preliminary Report on Patentability for International Application No. PCT/US2010/052902, United States Patent Office, United States, mailed Apr. 26, 2012.

English-Language Abstract for Chinese Patent Publication No. 2682432 Y, published Mar. 2, 2005; 1 page.

English-Language Translation of the First Office Action directed to related Chinese Patent Application No. 201080057469.9, mailed Jan. 30, 2014; 7 pages.

* cited by examiner

HINGE MECHANISM FOR A FLUID FILLED LENS ASSEMBLY

CROSS REFERENCE TO RELATED APPLICATIONS

This application is a continuation application of U.S. application Ser. No. 12/904,769, filed Oct. 14, 2010, now U.S. Pat. No. 8,353,593, which claims priority to U.S. Provisional Patent Application No. 61/251,819, filed Oct. 15, 2009, both of which are incorporated herein by reference in their entirety.

BACKGROUND

1. Field

Embodiments of the present invention relate to fluid-filled lenses and in particular to variable fluid-filled lenses.

2. Background Art

Basic fluid lenses have been known since about 1958, as described in U.S. Pat. No. 2,836,101, incorporated herein by reference in its entirety. More recent examples may be found in "Dynamically Reconfigurable Fluid Core Fluid Cladding Lens in a Microfluidic Channel" by Tang et al., Lab Chip, 2008, vol. 8, p. 395, and in WIPO publication WO2008/063442, each of which is incorporated herein by reference in its entirety. These applications of fluid lenses are directed towards photonics, digital phone and camera technology and microelectronics.

Fluid lenses have also been proposed for ophthalmic applications (see, e.g., U.S. Pat. No. 7,085,065, which is incorporated herein by reference in its entirety). In all cases, the advantages of fluid lenses, such as a wide dynamic range, ability to provide adaptive correction, robustness, and low cost have to be balanced against limitations in aperture size, possibility of leakage, and consistency in performance. The '065 patent, for example, has disclosed several improvements and embodiments directed towards effective containment of the fluid in the fluid lens to be used in ophthalmic applications, although not limited to them (see, e.g., U.S. Pat. No. 6,618,208, which is incorporated by reference in its entirety). Power adjustment in fluid lenses has been effected by injecting additional fluid into a lens cavity, by electrowetting, application of ultrasonic impulse, and by utilizing swelling forces in a cross-linked polymer upon introduction of a swelling agent such as water.

BRIEF SUMMARY

In an embodiment, a hinge for a fluid-filled lens assembly includes a base having a first end configured to connect to a temple arm of the lens assembly and a second end configured to connect to a frame of the lens assembly, wherein the base includes a gap that is shaped to allow for tubing to pass from the first end to the second end of the base. In an embodiment, the first end of the base includes a cammed surface configured to engage a surface of the temple arm. In an embodiment, the first and second ends of the base are configured to flex around a rotation axis of the hinge.

In another embodiment, a fluid-filled lens assembly comprises: a temple arm; a reservoir disposed within the housing; a frame; a fluid-filled lens disposed within the frame; tubing connecting the reservoir to the fluid-filled lens; and a hinge attached to the temple arm and to the frame. The hinge includes a base having a gap that is shaped to allow for tubing to pass from a first end to a second end of the base.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
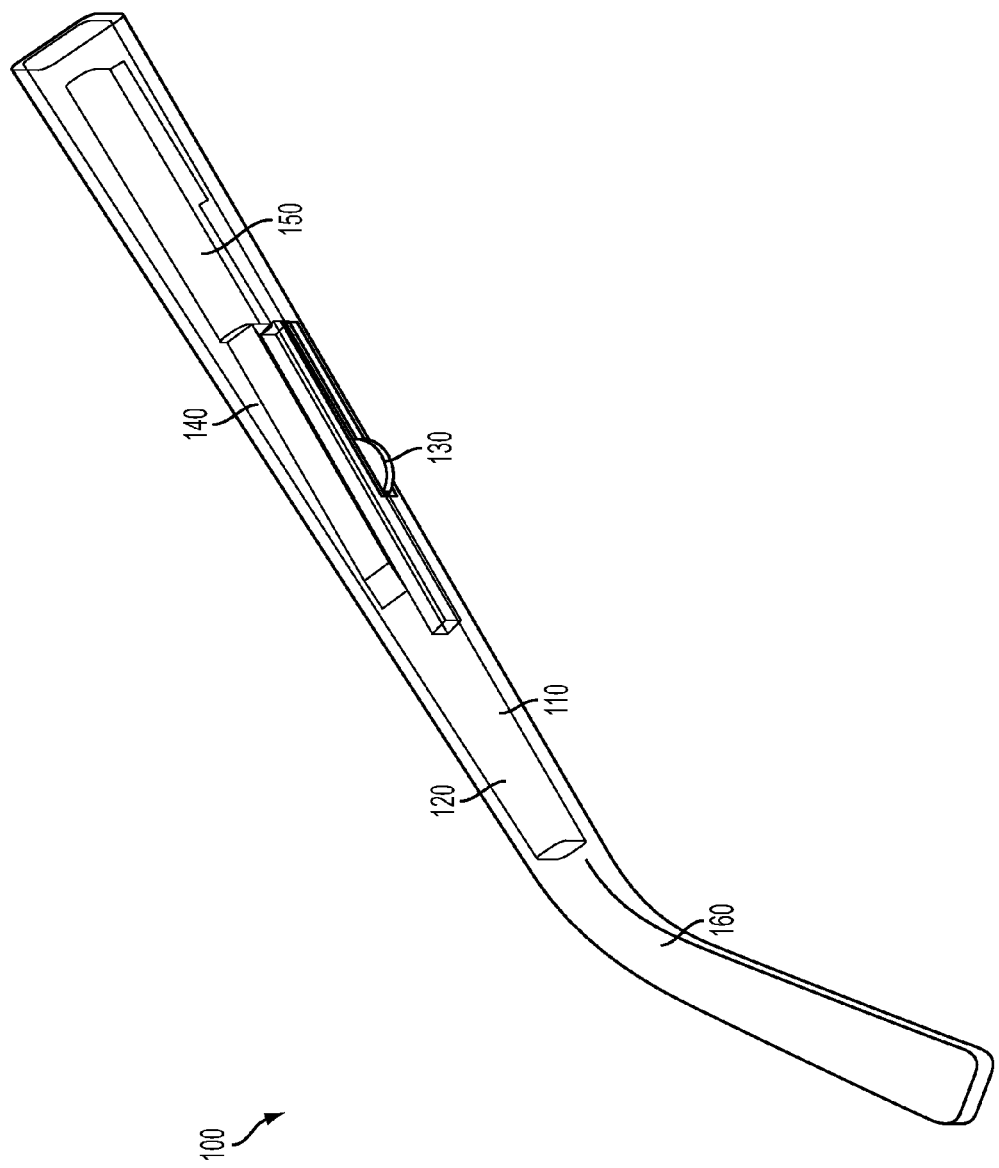
FIG. 1 illustrates a perspective view of an embodiment of a caliper actuator assembly.

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of one skilled in the art to affect such feature, structure or characteristic in connection with other embodiments whether or not explicitly described.

Fluid lenses have important advantages over conventional means of vision correction, such as rigid lenses and contact lenses. First, fluid lenses are easily adjustable. Thus an individual who requires an additional positive power correction to view near objects can be fitted with a fluid lens of base power matching the distance prescription. The user can then adjust the fluid lens to obtain additional positive power correction as needed to view objects at intermediate and other distances.

Second, fluid lenses can be adjusted continuously over a desired power range by the wearer. As a result, the wearer can adjust the power to precisely match the refractive error for a particular object distance in a particular light environment. Thus, fluid lenses allow adjustment of power to compensate for alteration of the natural depth of focus of the eye that depends on the wearer's pupil size, which is in turn dependent on the ambient light level.

Third, although 20/20 vision, which corresponds to an image resolution of 1 minute of arc (1/60 degree) is generally acknowledged to represent an acceptable quality of vision, the human retina is capable of finer image resolution. It is known that a healthy human retina is capable of resolving 20 seconds of arc (1/300 degree). Corrective eyeglasses designed to enable a patient to achieve this superior level of vision have a resolution of about 0.10 D or better. This resolution can be achieved with continuously adjustable fluid lens elements.

In an embodiment of a fluid filled lens in a pair of eyeglasses, the optical power of the fluid filled lens may be adjusted by moving an actuator attached to a reservoir located in a temple arm of the eyeglass frame. The reservoir is attached to the fluid filled lens via a connecting tube. Moving the actuator a first way compresses the reservoir and pushes fluid into the fluid lens. Moving the actuator a second way allows the reservoir to expand and pull fluid from the fluid lens. The compression and expansion of the reservoir changes the optical power of the fluid filled lens. In an embodiment, one or more fluid lenses may be provided, each with its own actuation system, so that a lens for each eye may be adjusted independently. This feature allow wearers, such as anisometropic patients, to correct any refractive error in each eye separately, so as to achieve appropriate correction in both eyes, which can result in better binocular vision and binocular summation. Further description and additional embodiments of the reservoir are described in U.S. application Ser. No. 12/904,736.

In such fluid filled lens designs, the fluid must pass from the reservoir located in the temple arm of the eyeglasses through a hinge located at the juncture between the temple arm and the lens frame located on the front of the eyeglasses. Because the hinge is subject to repeated bending, the connecting tube may prematurely fail if made of a weak material. Further, if the connecting tube is bent beyond a certain level, the fluid pressure in the lens may be affected. Accordingly, a fluid filled lens assembly according to an embodiment of the present invention provides ample space within the temple and end piece for the connecting tube to bend without kinking. In addition, according to an embodiment, the entire hinge mechanism may be located within the volume of the temple arm and frame.

FIG. 1 illustrates a perspective view of a caliper actuator assembly 100, according to an embodiment of the present invention. Caliper actuator assembly 100 includes temple cover 110, which includes a hollow outer portion and a hollow inner portion formed together to enclose additional pieces of caliper actuator assembly 100. Distal end 160 of temple cover 110 is shaped to fit over a wearer's ear. Caliper actuator assembly 100 further includes temple chassis 120, wheel 130, and slider 140. In an embodiment, wheel 130 and slider 140 are longitudinally slidably disposed within temple chassis 120. Caliper actuator assembly 100 operates to compress reservoir 150 and transfer fluid between reservoir 150 and a fluid lens (not shown). The compressing force may be applied in various ways, such as for example, by rotating wheel 130 or by translating the wheel along a slot. Additional methods of applying compressing force are also described herein. The compression of reservoir 150 may be effected either by compressing reservoir 150 in a vertical or horizontal direction against a ceiling or inner wall of temple chassis 120, as described in detail below.

Figure 2:
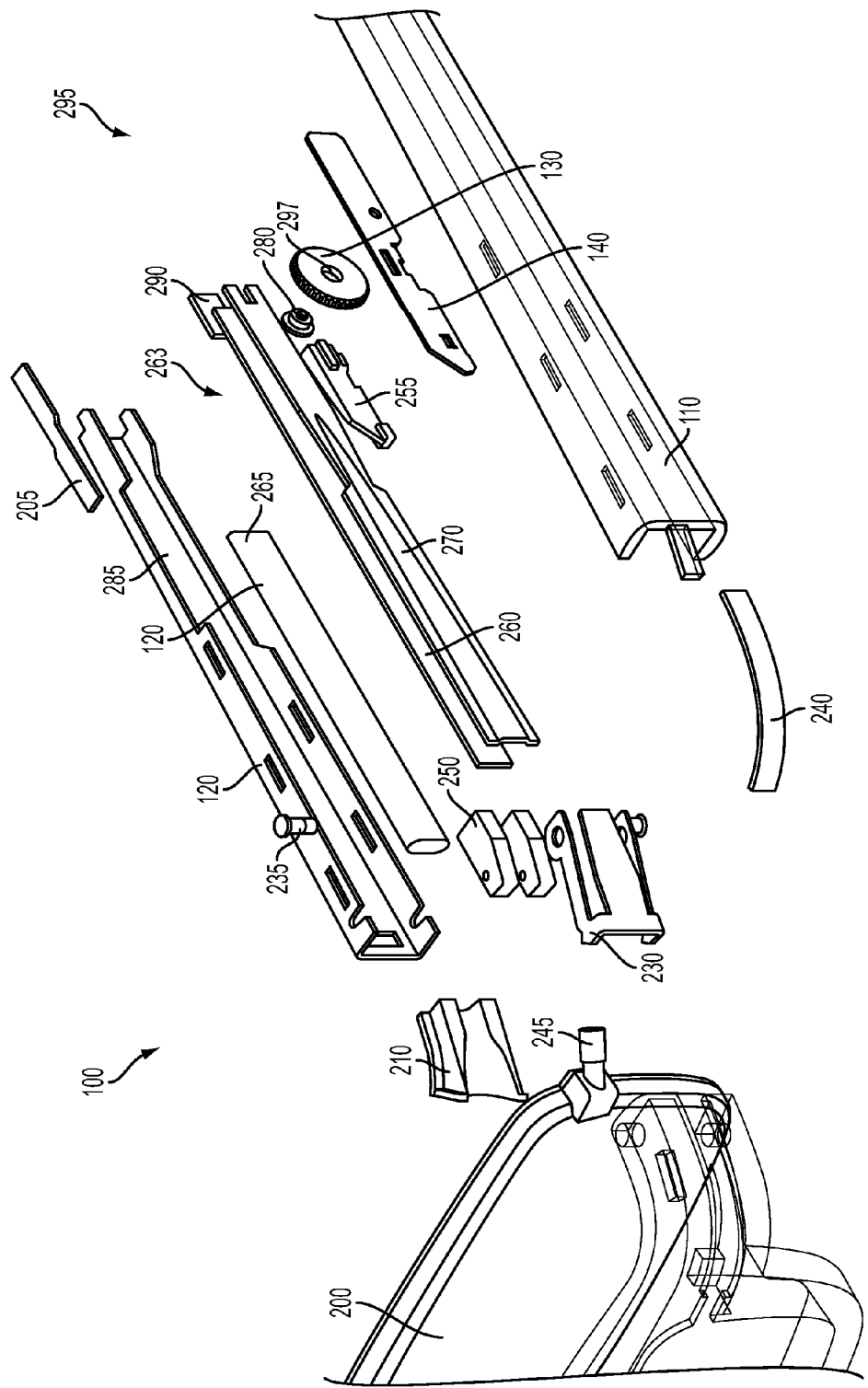
FIG. 2 illustrates an exploded perspective view of an embodiment of a caliper actuator assembly.

FIG. 2 illustrates an exploded perspective view of an embodiment of caliper actuator assembly 100. In an embodiment, slider subassembly 295 (described below with respect to FIGS. 3-4) is configured to translate along one or more of temple cover 110 and temple chassis 120 in order to compress reservoir 150. In operation, a user rotates wheel 130, which moves slider block 255, which in turn compresses a relatively stiff metal plate, such as compression arm 270, that is in contact with a first side surface 265 of reservoir 150. A second side surface (not shown) of reservoir 150 is placed against inner wall 285 of temple chassis 120, a portion of temple cover 110, or any other suitable surface. Slider 140 presses against compression arm 270, which compresses reservoir 150 in a controllable manner. In an embodiment, the length of the lateral movement of wheel 130 is proportional to the magnitude of compression of the compression arm, and is proportional to the magnitude of compression of the reservoir. Further description and additional embodiments of the actuator are described in U.S. application Ser. No. 12/904,720.

In an embodiment, wheel 130 has a knurled edge in order to provide secure contact with the finger of the user as well more precise control over the translation of wheel 130.

Lens module 200 is connected via outlet port 245 to a connecting tube (not shown), which is connected to reservoir 150. Lens module 200 may further include a flexible back surface provided by, for example, a flexible membrane (not shown) stretched flat over the edge of rigid optical lens. To change the optical power of fluid filled lens module 200, the membrane may be inflated through the addition of a fluid in communication with reservoir 150.

The connecting tube delivers fluid from lens module 200 to reservoir 150 and vice versa. The connecting tube is designed to be relatively impermeable to the fluid contained therein. In an embodiment, the connecting tube is configured to allow a minimum flow rate at all times in order to ensure a minimum speed of response to the user moving wheel 130 in order to change the optical power of fluid filled lens module 200. The connecting tube is connected at one end to outlet port 245 of lens module 200 and at the other end to reservoir 150. In an embodiment, the overall assembly including the lens module 200, the connecting tube, and reservoir 150 is designed to maintain a seal excluding fluids and air for an overall use period of two years or more. In an embodiment, the connecting tube has to be thin in order to be accommodated within the hinge cavity. In an embodiment, it is less than 2.0 mm in outer diameter and less than 0.50 mm in wall thickness, in order to maintain an adequate flow of fluid. In an embodiment, it is capable of being bent by an angle of no less than 60 degrees. In an embodiment, it is capable of being bent by an angle of no less than 45 degrees without crimping. In an embodiment, it is durable to repeated flexing of the hinge.

Hinge block 250 and spring 230 are enclosed within a covered area between inner block 210 and outer block 240. Hinge block 250 includes a gap that is shaped to allow the connecting tube to pass through hinge block 250. Additional embodiments of the spring are described below with respect to FIGS. 9-22. Caliper actuator assembly 100 includes wheel 130 held in place by axle 280, slider 140, slider block 255, spacer block 290, and compression arm 270. These parts are assembled into a temple chassis subassembly and are held in place by screws 235. Rubber strip 205 includes a flexible surface upon which wheel 130 may move. In an embodiment, wheel 130 may rotate. In other embodiments it may translate, and in other embodiments it may rotate and translate.

Assembly

Figure 3:
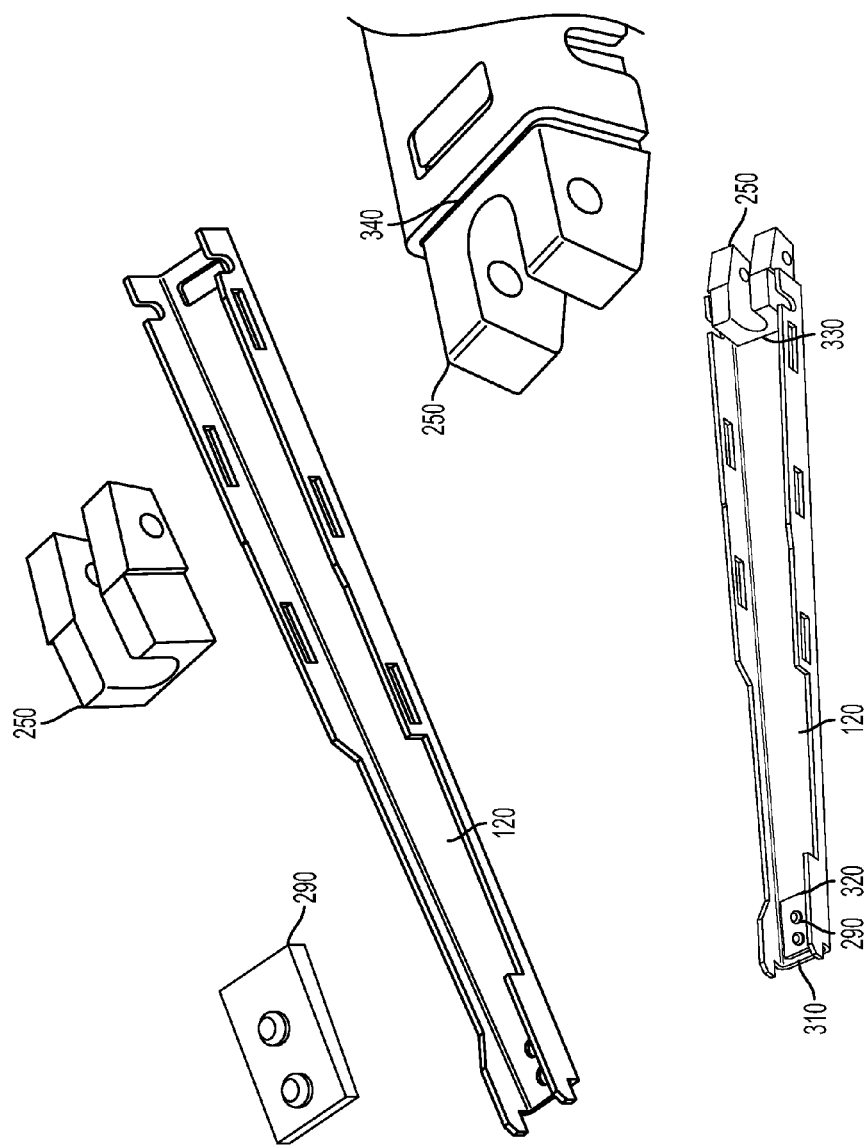
FIG. 3 illustrates a first set of steps for assembling an embodiment of a temple chassis subassembly.
Figure 4:
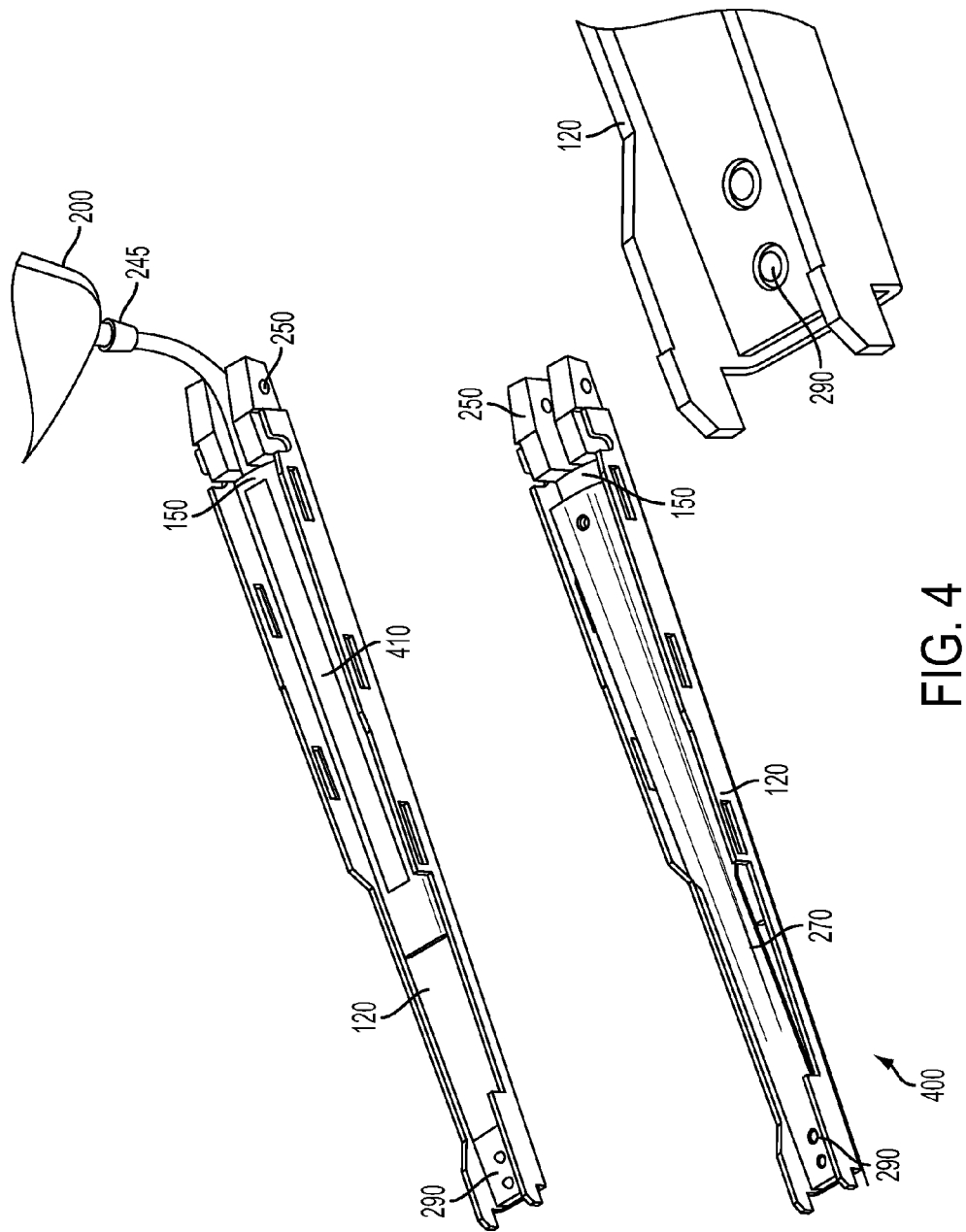
FIG. 4 illustrates a second set of steps for assembling an embodiment of a temple chassis subassembly.

FIGS. 3-4 illustrate a set of steps for assembling an embodiment of a temple chassis subassembly. Beginning with FIG. 3, spacer block 290 is placed onto temple chassis 120. Next, spacer block 290 is welded onto temple chassis 120 along edges 310 and 320. Next, hinge block 250 is placed onto temple chassis 120. Next, hinge block 250 is welded onto temple chassis 120 along edges 330 and 340. The temple chassis subassembly continues with FIG. 4, which illustrates a second set of steps for assembling an embodiment of temple chassis subassembly 400. A backing (not shown) may be removed from tape 410 on both sides of reservoir 150. Reservoir 150 is placed against temple chassis 120. Compression arm 270 is then placed onto spacer block 290. Compression arm 270 is then welded onto spacer block 290.

Figure 5:
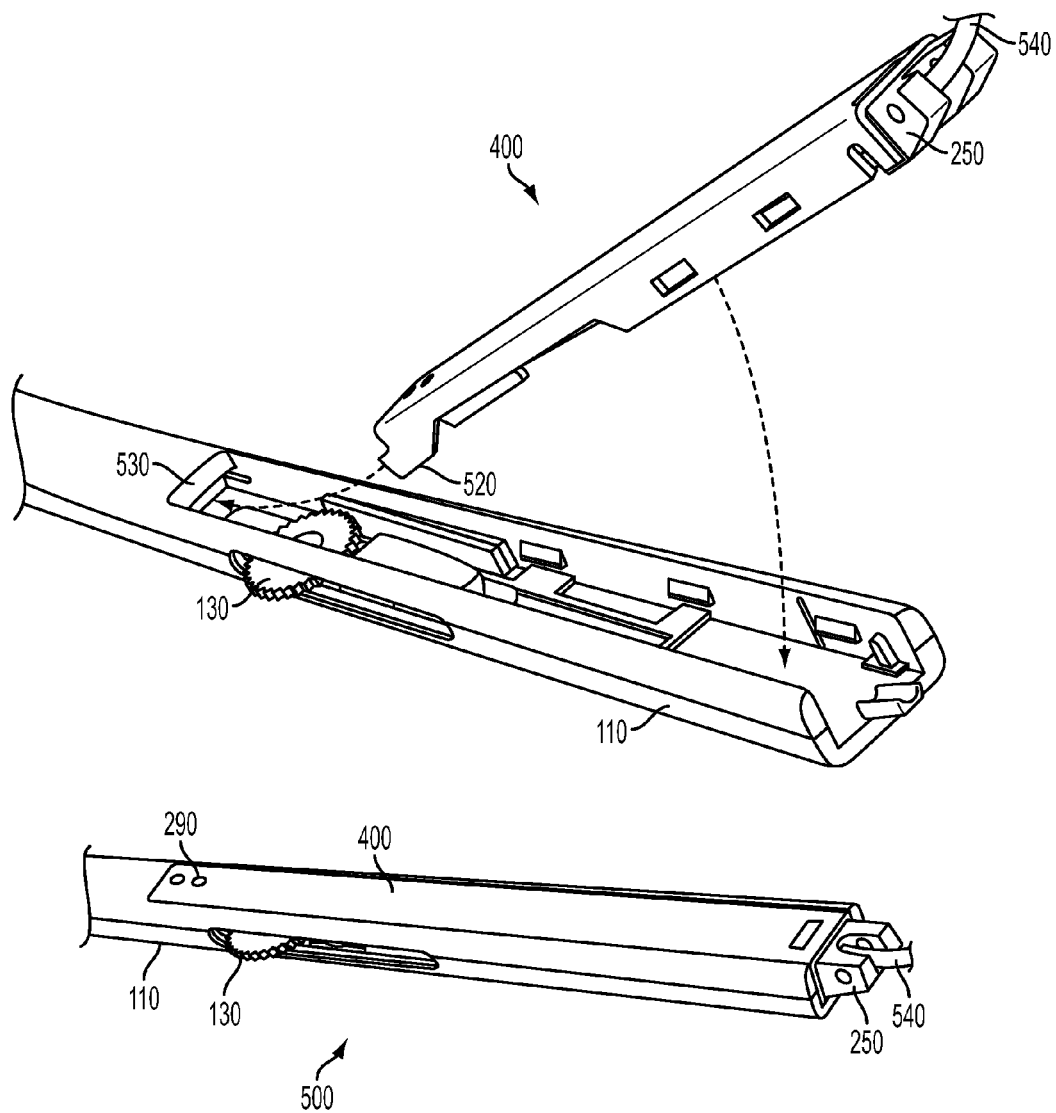
FIG. 5 illustrates a set of steps for assembling a temple subassembly, according to an embodiment.

FIG. 5 illustrates a set of steps for assembling temple subassembly 500, according to an embodiment. First, tabs 520 of temple chassis subassembly 400 are slid into rear slot 530 of temple cover 110. Next, temple chassis subassembly 400 is rotated within temple cover 110 until it snaps into place. It is recommended that slider subassembly 295 be positioned as far distally as possible within temple cover 110. Further, it is recommended that when snapping temple chassis subassembly 400 into temple cover 110, tube 540 does not become pinched between hinge block 250 and temple cover 110 or temple chassis subassembly 400.

Figure 6:
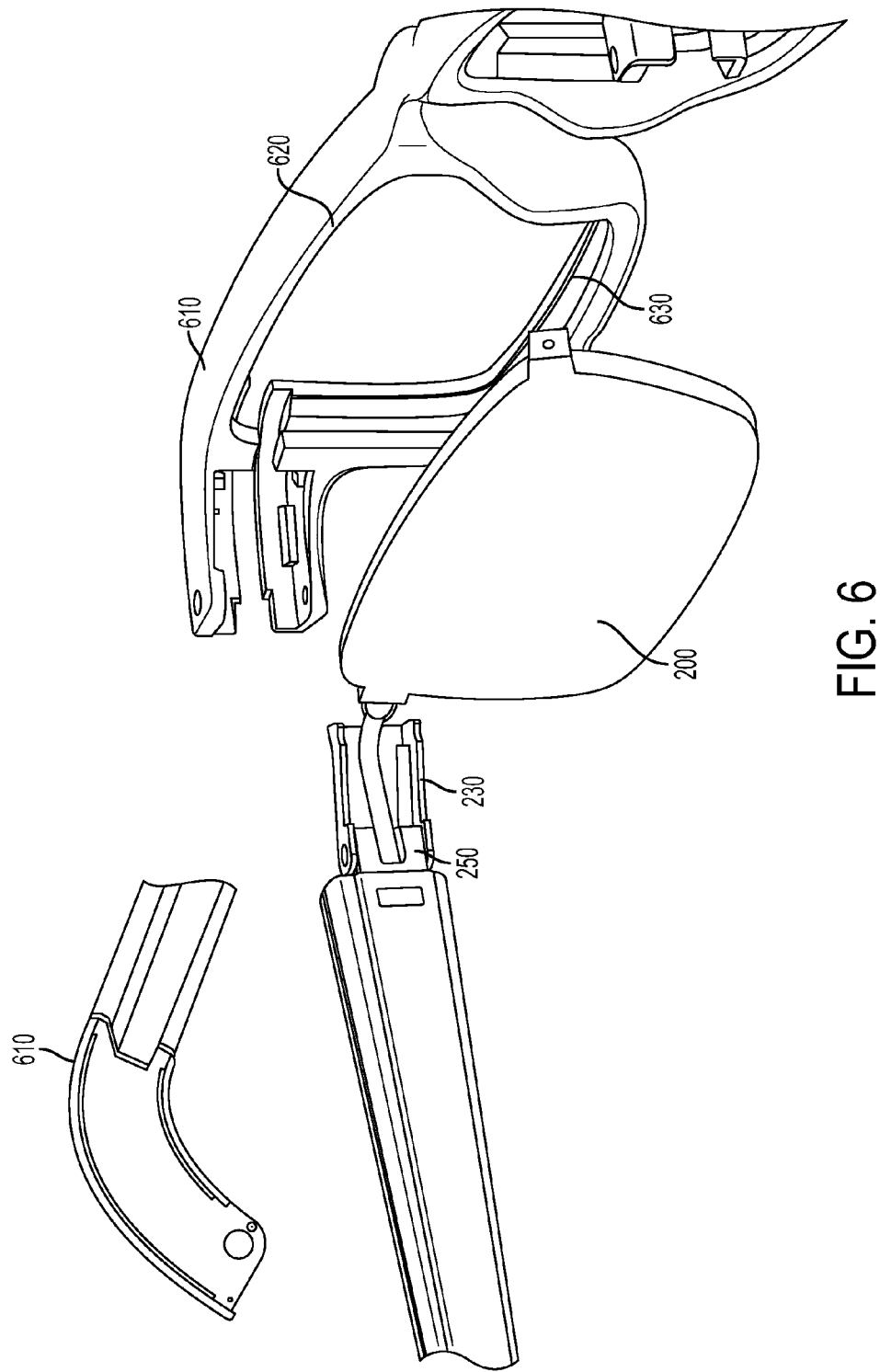
FIG. 6 illustrates a first set of steps for assembling a frame assembly, according to an embodiment.
Figure 7:
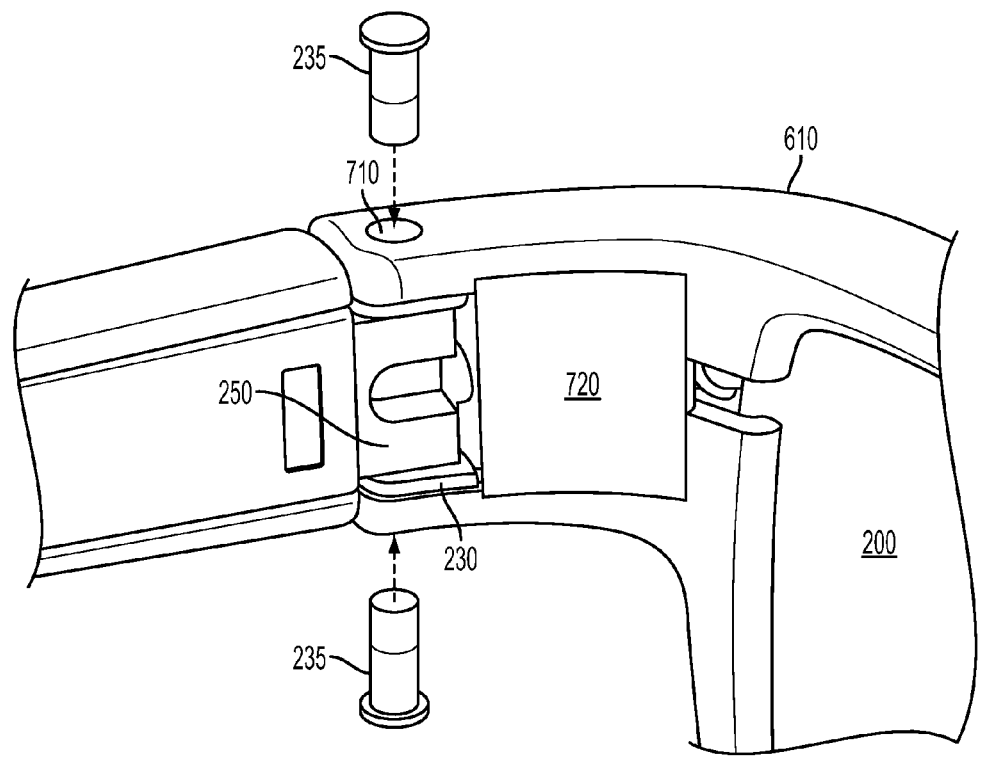
FIG. 7 illustrates a second set of steps for assembling a frame assembly, according to an embodiment.

FIGS. 6-7 illustrate a set of steps for assembling a frame assembly, according to an embodiment. Beginning with FIG. 6, in an embodiment, an adhesive, such as glue, is applied to the inside edge of frame 610. Next, spring 230 is placed against hinge block 250. In an embodiment, frame 610 is then pulled over lens module 200 so that upper portion 620 and lower portion 630 of frame 610 are coupled with lens module 200. An adhesive, such as glue, may be used to bond lens module 200 to frame 610. One of skill in the art will recognize that, in another embodiment, lens module 200 may be added to frame 610 after assembly of frame assembly 600 is complete. The frame assembly continues with FIG. 7, which shows a second set of steps for assembling an embodiment of frame assembly 600. In an embodiment, screws 235 are inserted into respective screw holes 710 in frame 610 into hinge block 250. FIG. 7 shows the frame assembled with spring 230, showing the addition of cover 720 to seal off the hinge mechanism and prevent access of water or contaminants to connecting tube 540. The steps shown in FIGS. 6 and 7 may be repeated for the second temple subassembly. In an embodiment, after frame assembly 600 is assembled, adequate time is allowed for any glue or adhesive to cure.

Figure 8:
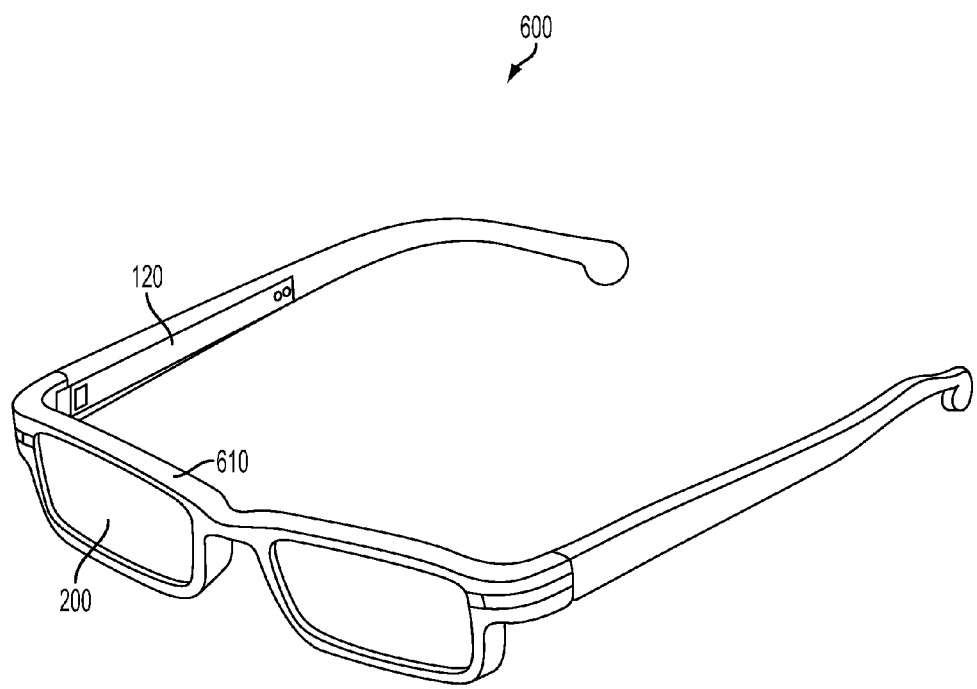
FIG. 8 illustrates a completed frame assembly, according to an embodiment.

FIG. 8 illustrates completed frame assembly 600 including temple chassis 120, frame 610 and lens module 200.

Figure 9:
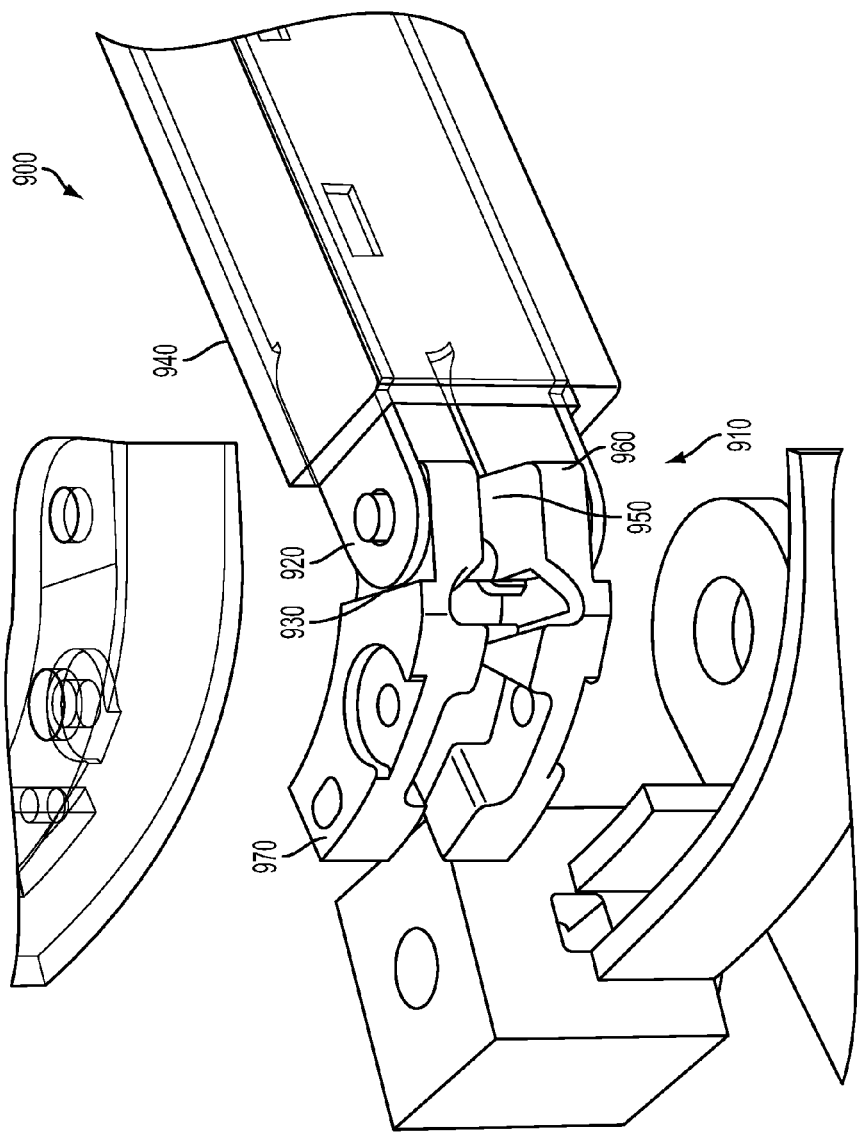
FIG. 9 illustrates a spring connected to a temple arm, according to an embodiment.

Additional embodiments of hinge springs will now be described. FIG. 9 illustrates an embodiment of a spring that may be used in frame assembly 600. In an embodiment, spring 910 includes an end 920. Additional embodiments of end 920 may include a cammed surface. When temple arm 900 rotates, end 920 rides up against a small peak 930. Force on end 920 from flexing creates stored energy that releases when temple arm 900 causes end 920 to move from peak 930. Temple arm 900 then accelerates and rotates to either folded or unfolded position. A hard stop 960 may be provided to prevent temple arm 900 from flexing too far. During assembly, the connecting tube (not shown) is routed through the center of hinge 970 through gap 950.

Figure 10:
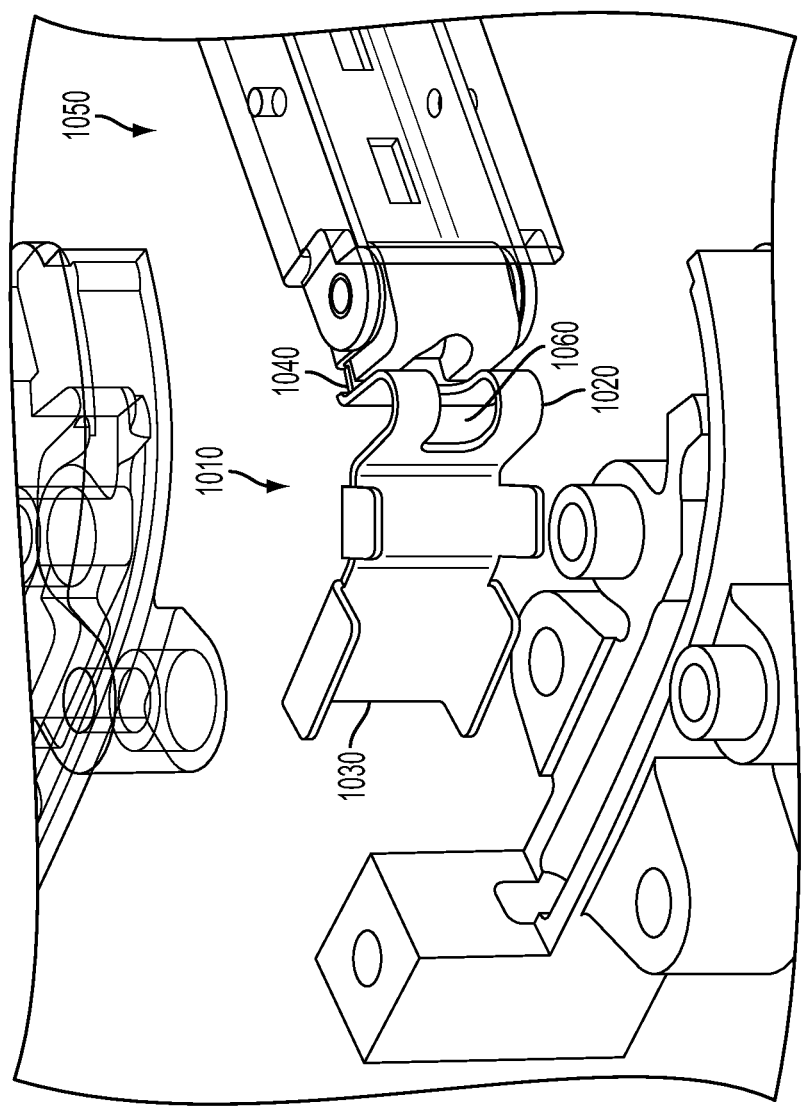
FIG. 10 illustrates a spring connected to a temple arm, according to an embodiment.

FIG. 10 shows another embodiment of a spring that may be used in frame assembly 600. In an embodiment, spring 1010 is a sheet metal hinge that uses a folded sheet metal arm 1020 to provide spring force. End 1030, which is closest to lens module 200 is fixed within frame 610 (not shown). End 1040 is attached to temple arm 1050. The flexure of spring 1010 occurs primarily within the bend (i.e., folded sheet metal arm 1020). During assembly, the connecting tube (not shown) is routed through the center of spring 1010 through gap 1060. Although spring 1010 is referred to herein as a "sheet metal" hinge, one of skill in the art will recognize that spring 1010 may be made of any material, even a non-metallic material, that satisfies the balance between flexibility and rigidity needed for spring 1010 to operate.

Figure 11:
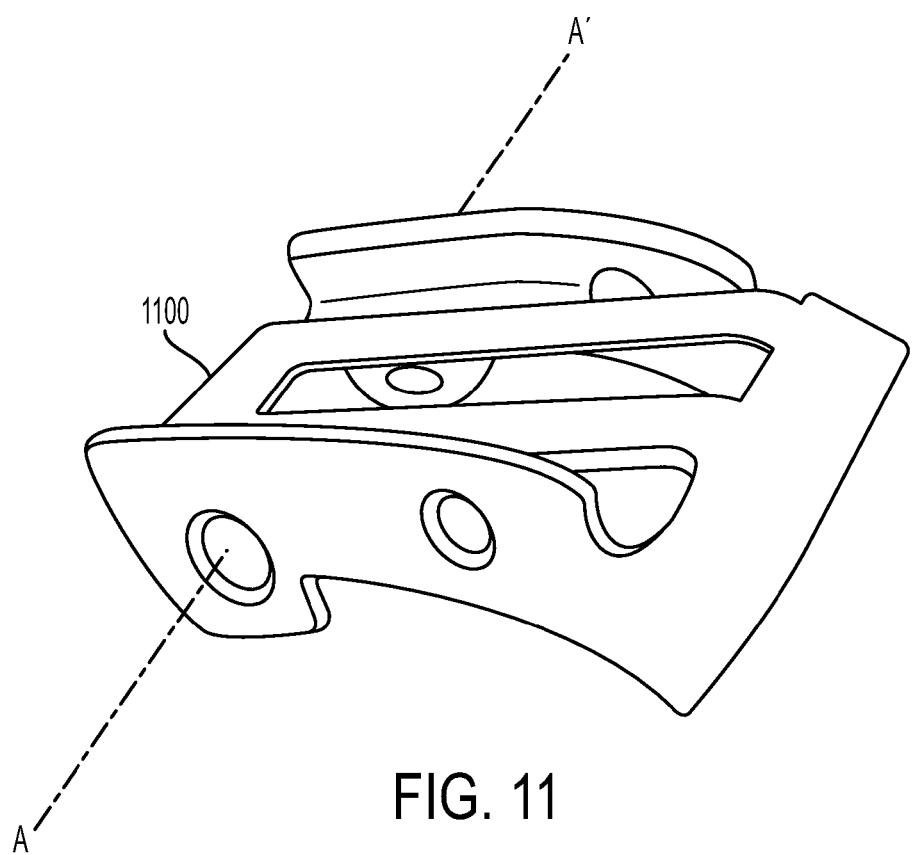
FIG. 11 shows a hinge, according to an embodiment.

FIG. 11 shows another embodiment of a hinge 1100. Hinge 1100 is configured to rotate around rotation axis A-A' with respect to a temple arm (not shown). As hinge 1100 rotates around rotation axis A-A', cantilever tab 1110 engages with a corresponding ridge on the temple arm (not shown).

Figure 12:
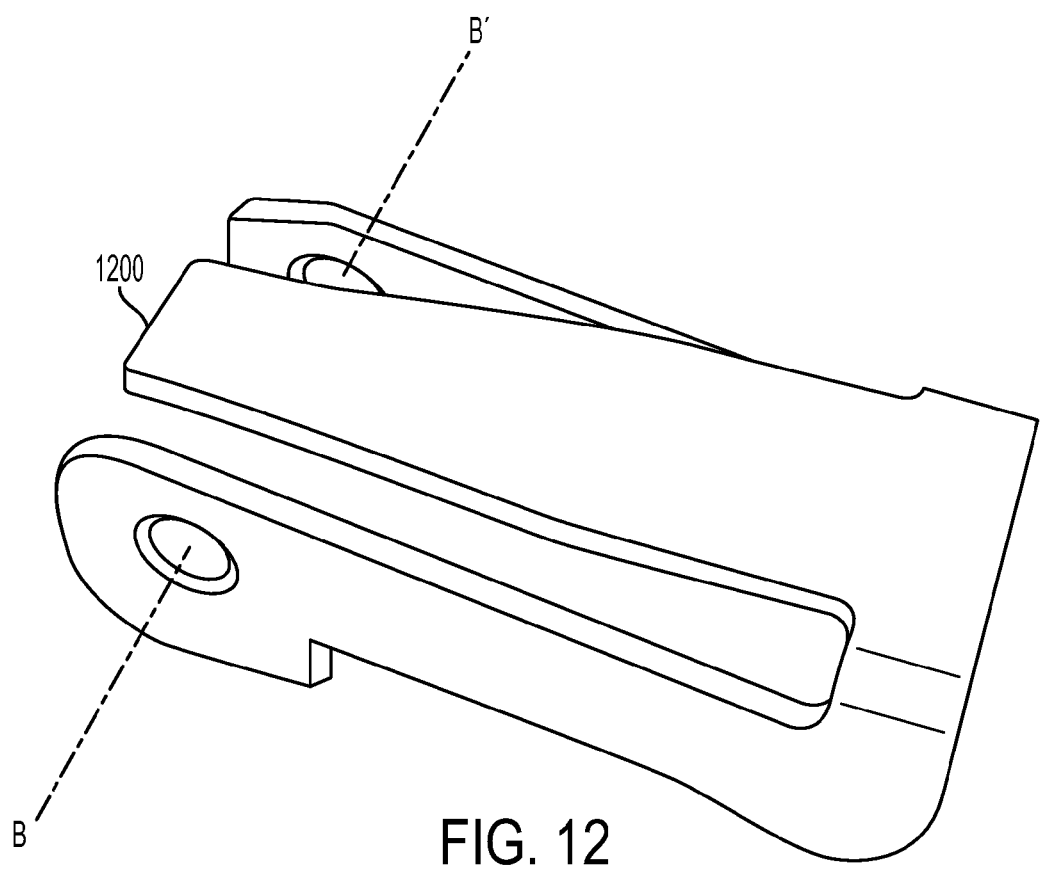
FIG. 12 shows a hinge, according to an embodiment.
Figure 13:
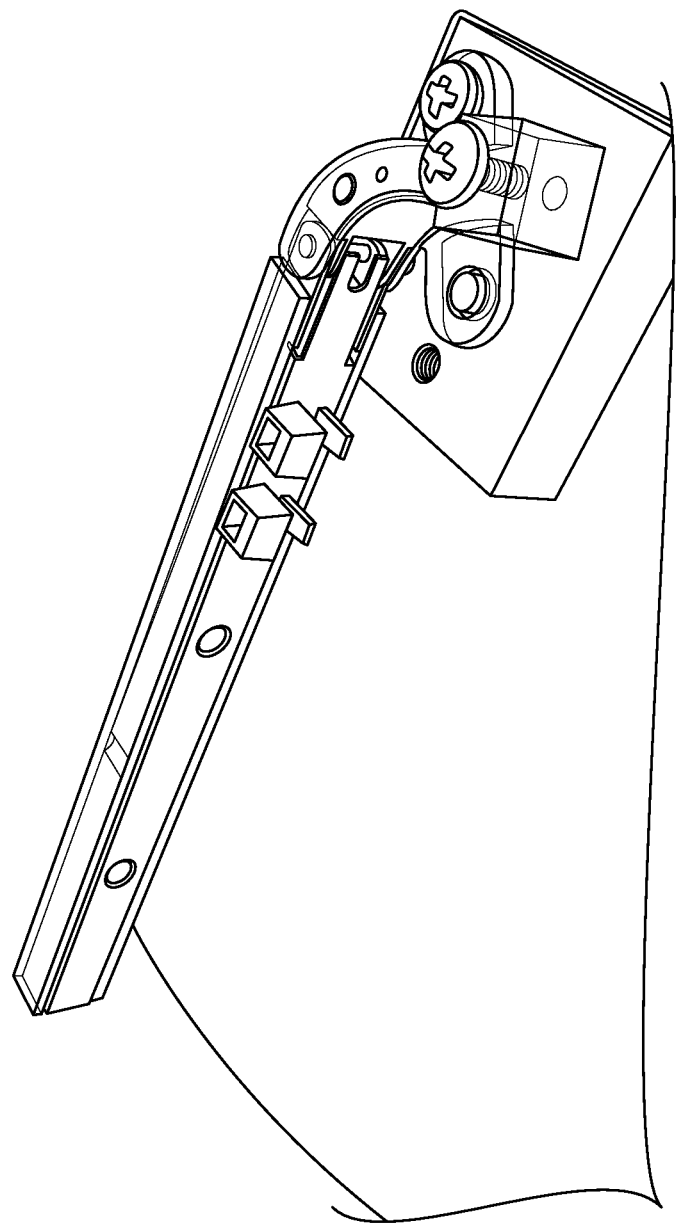
FIG. 13 shows a view of a leaf spring hinge embodiment.
Figure 14:
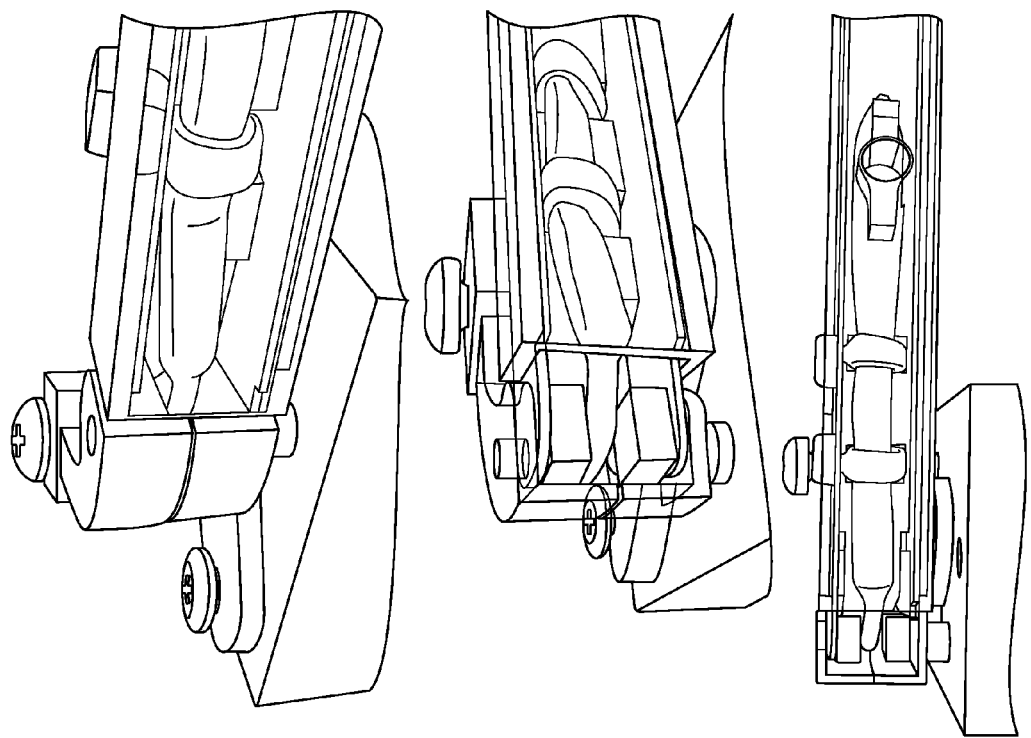
FIG. 14 shows further views of a leaf spring hinge embodiment.
Figure 14:
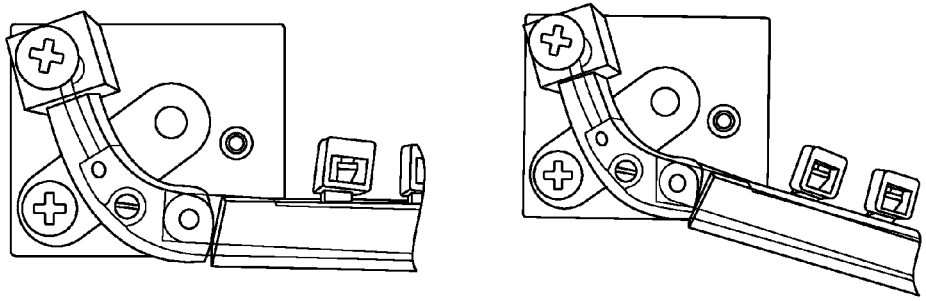
Figure 15:
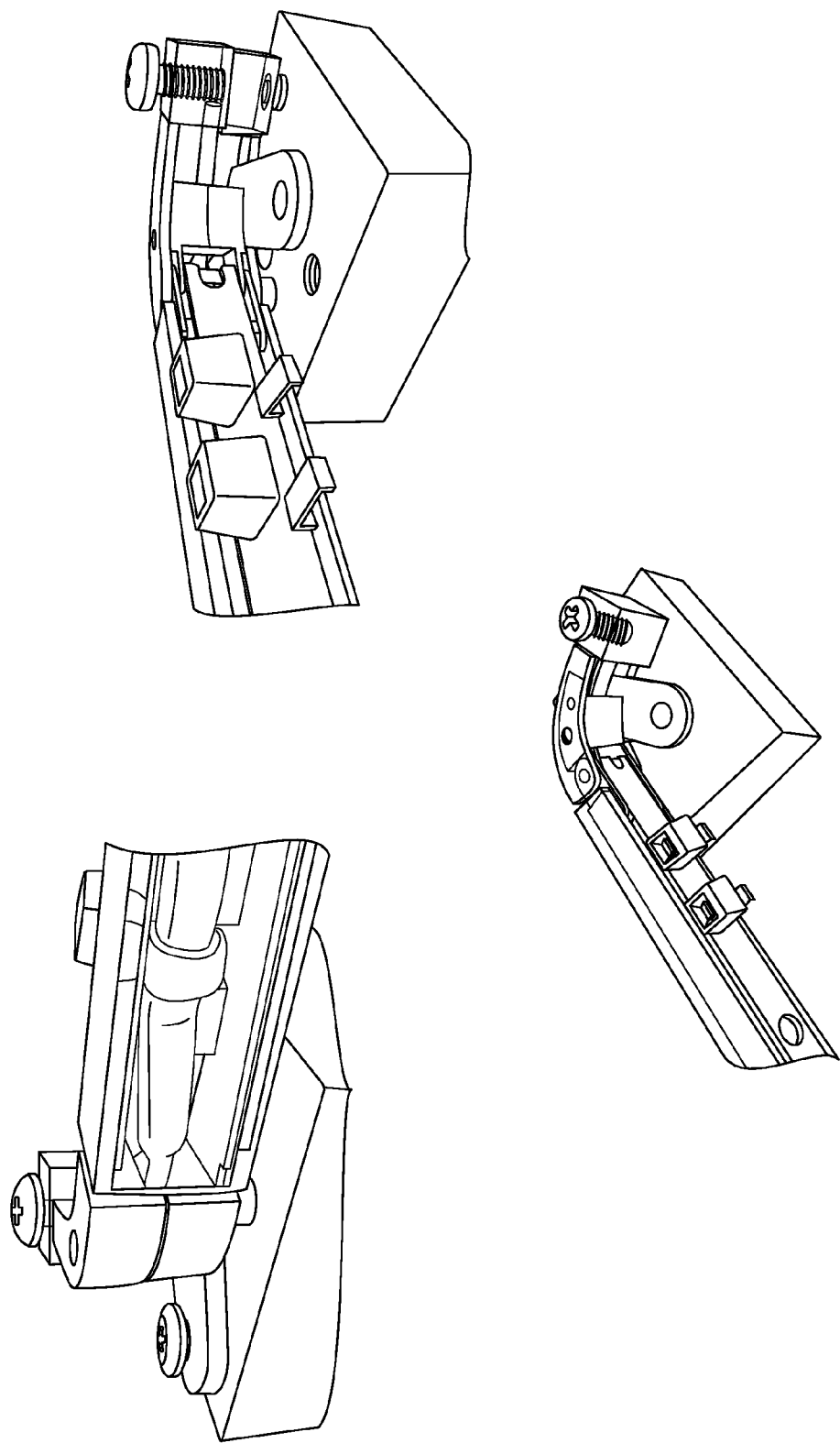
FIG. 15 shows further views of a leaf spring hinge embodiment.
Figure 16:
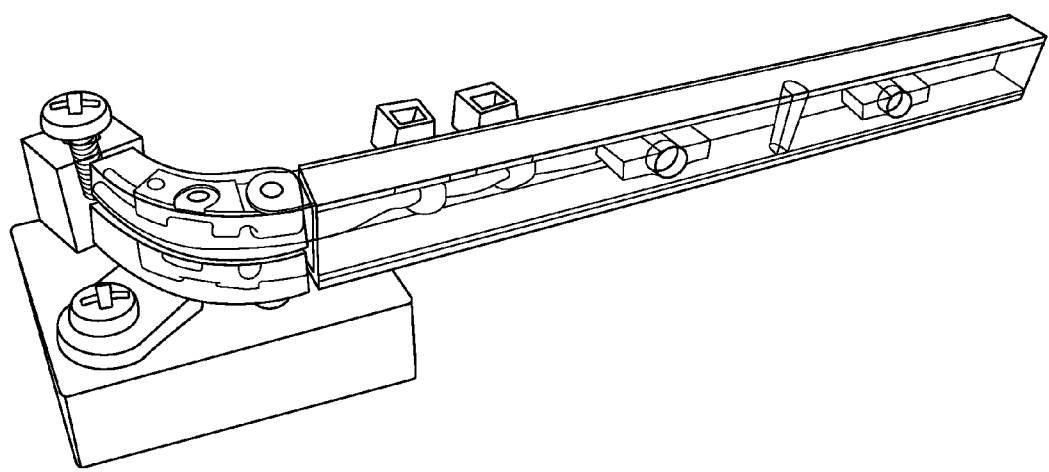
FIG. 16 shows a further view of a leaf spring hinge embodiment.

FIG. 12 shows another embodiment of a hinge 1200. Hinge 1200 is configured to rotate around rotation axis B-B' with respect to a temple arm (not shown). As hinge 1200 rotates around rotation axis B-B', cantilever tab 1210 engages with a corresponding ridge on the temple arm (not shown).

FIGS. 13-16 show views of a leaf spring hinge from different perspectives, according to an embodiment of the present invention.

Figure 17:
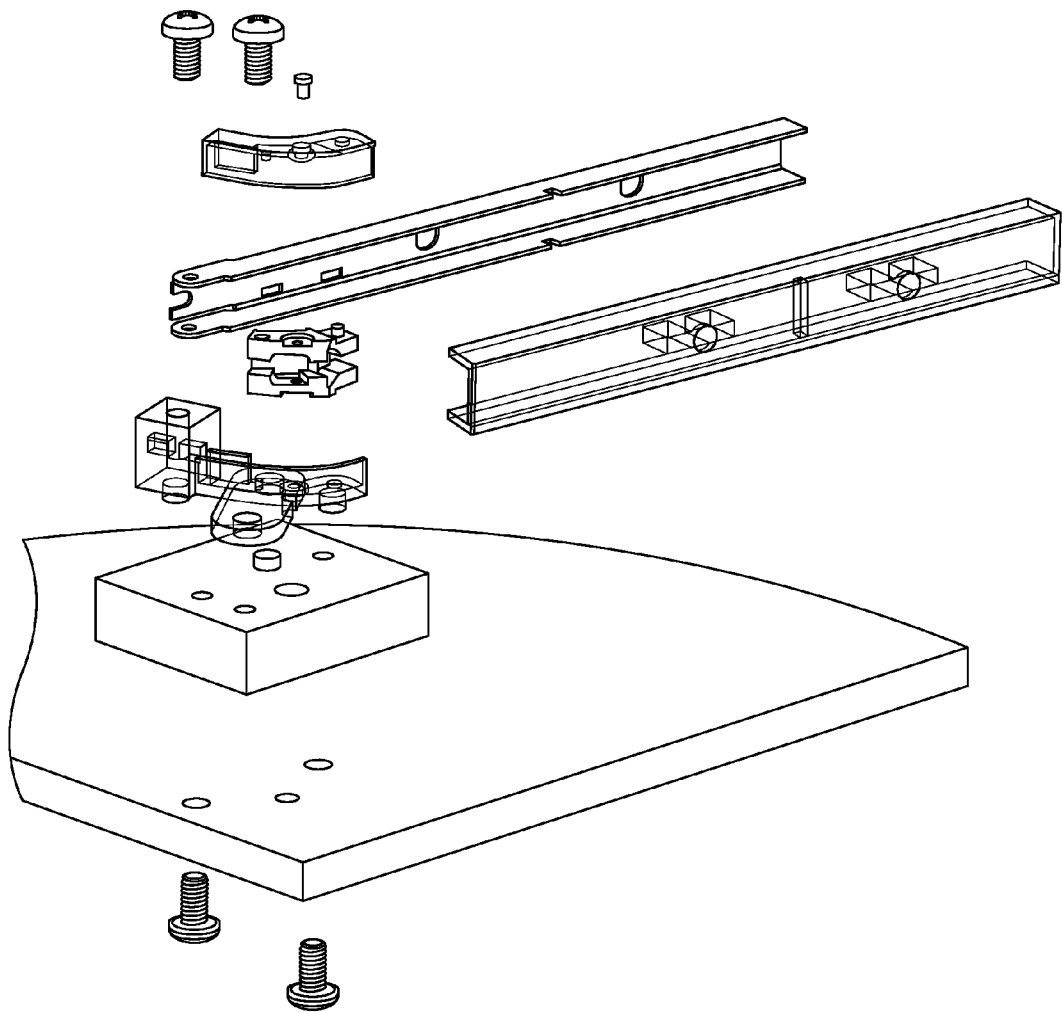
FIG. 17 illustrates an exploded view of a leaf spring hinge embodiment.
Figure 18:
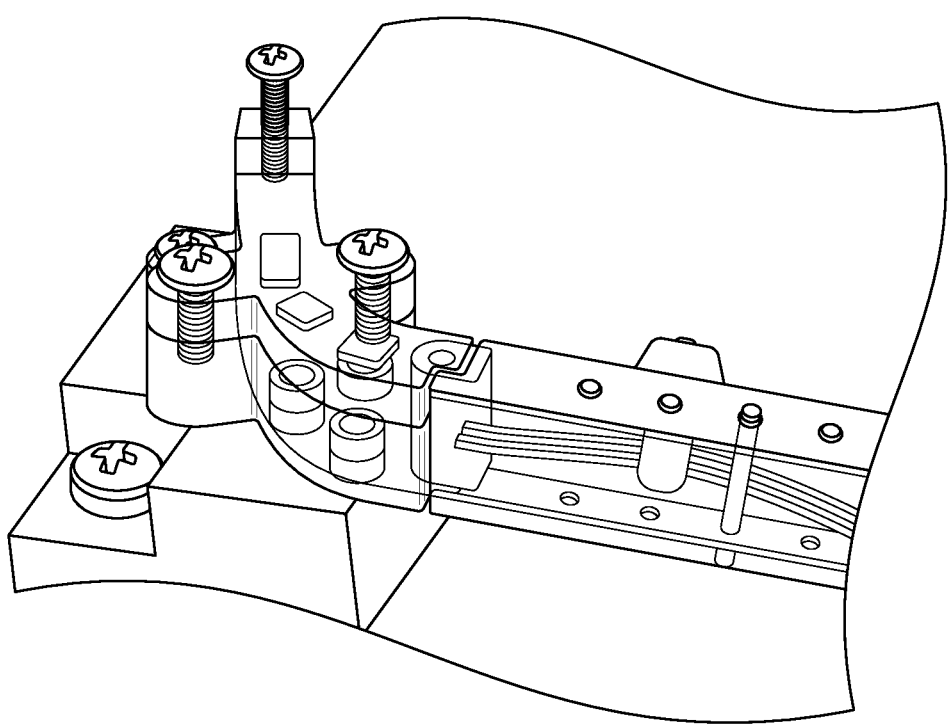
FIG. 18 shows a view of a sheet metal spring hinge, according to an embodiment.
Figure 19:
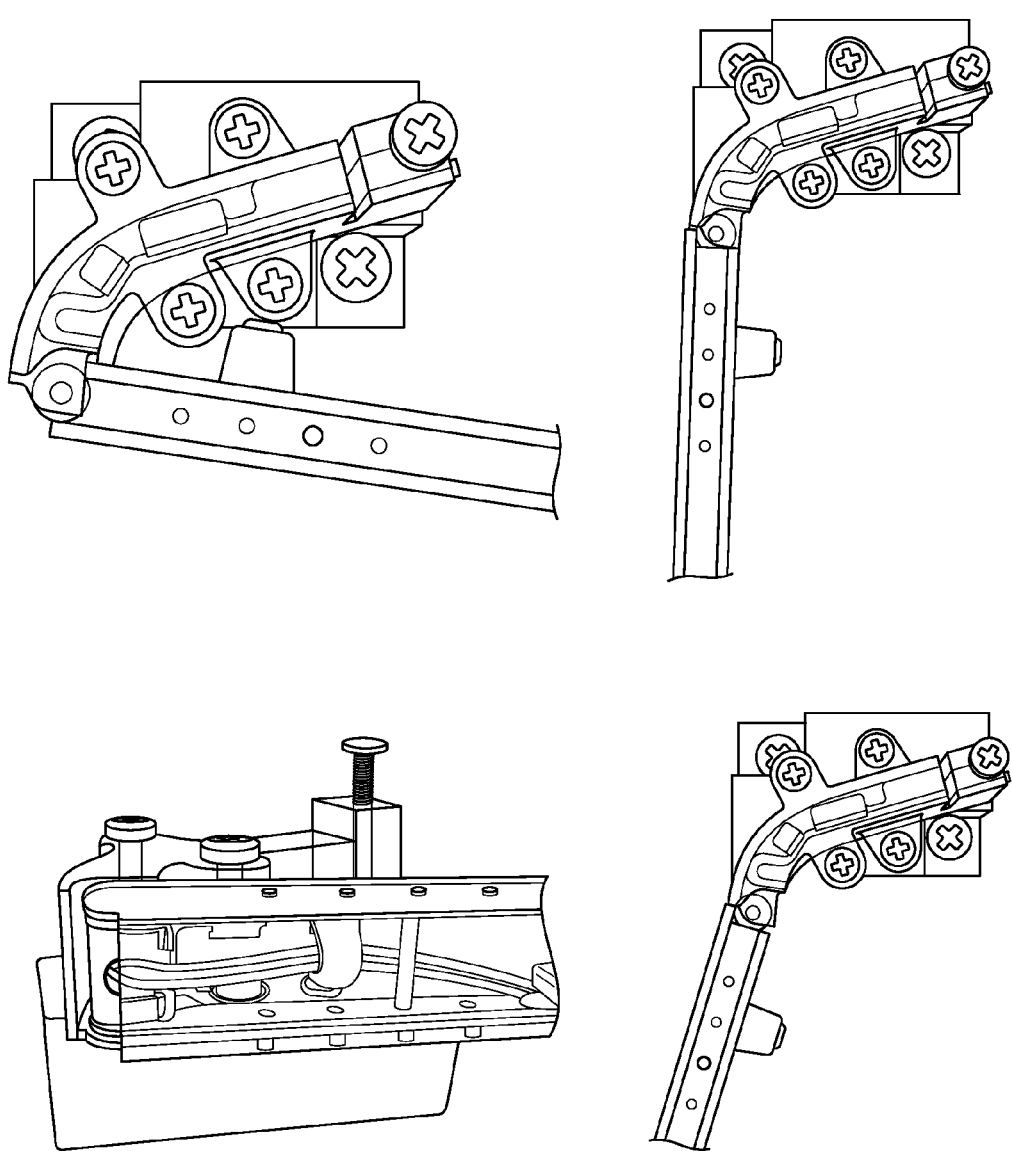
FIG. 19 shows further views of a sheet metal spring hinge, according to an embodiment.
Figure 20:
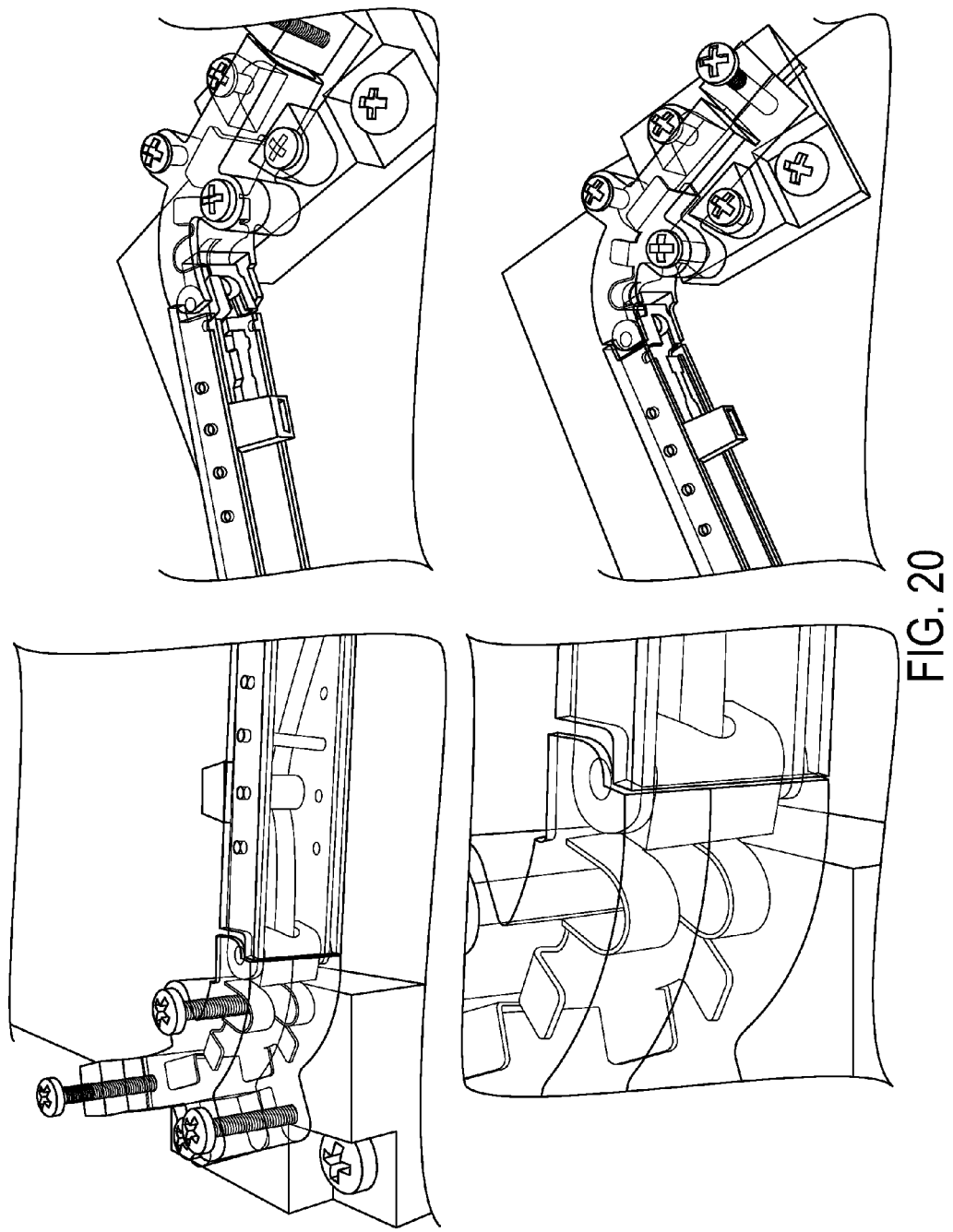
FIG. 20 shows further views of a sheet metal spring hinge, according to an embodiment.
Figure 21:
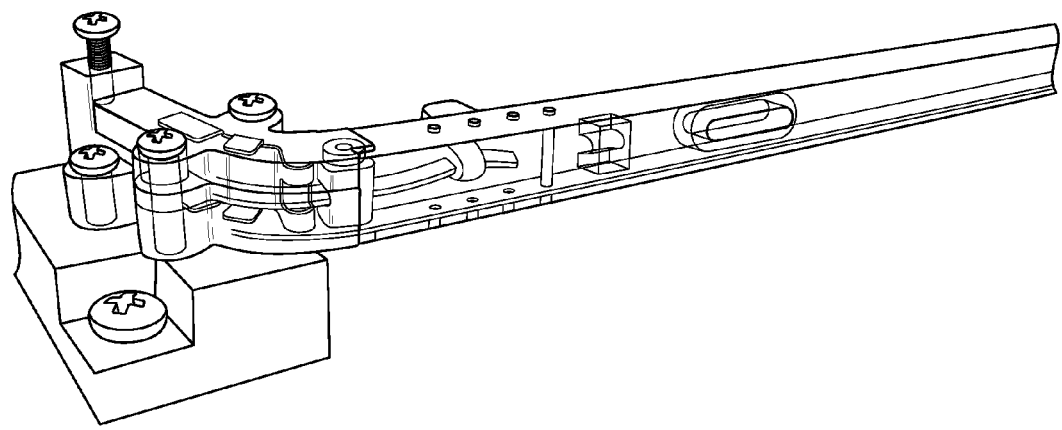
FIG. 21 shows a further view of a sheet metal spring hinge, according to an embodiment.

FIG. 17 illustrates an exploded view of a leaf spring hinge above a breadboard, according to an embodiment of the present invention.

FIGS. 18-21 show views of a sheet metal spring hinge from different perspectives, according to an embodiment of the present invention.

Figure 22:
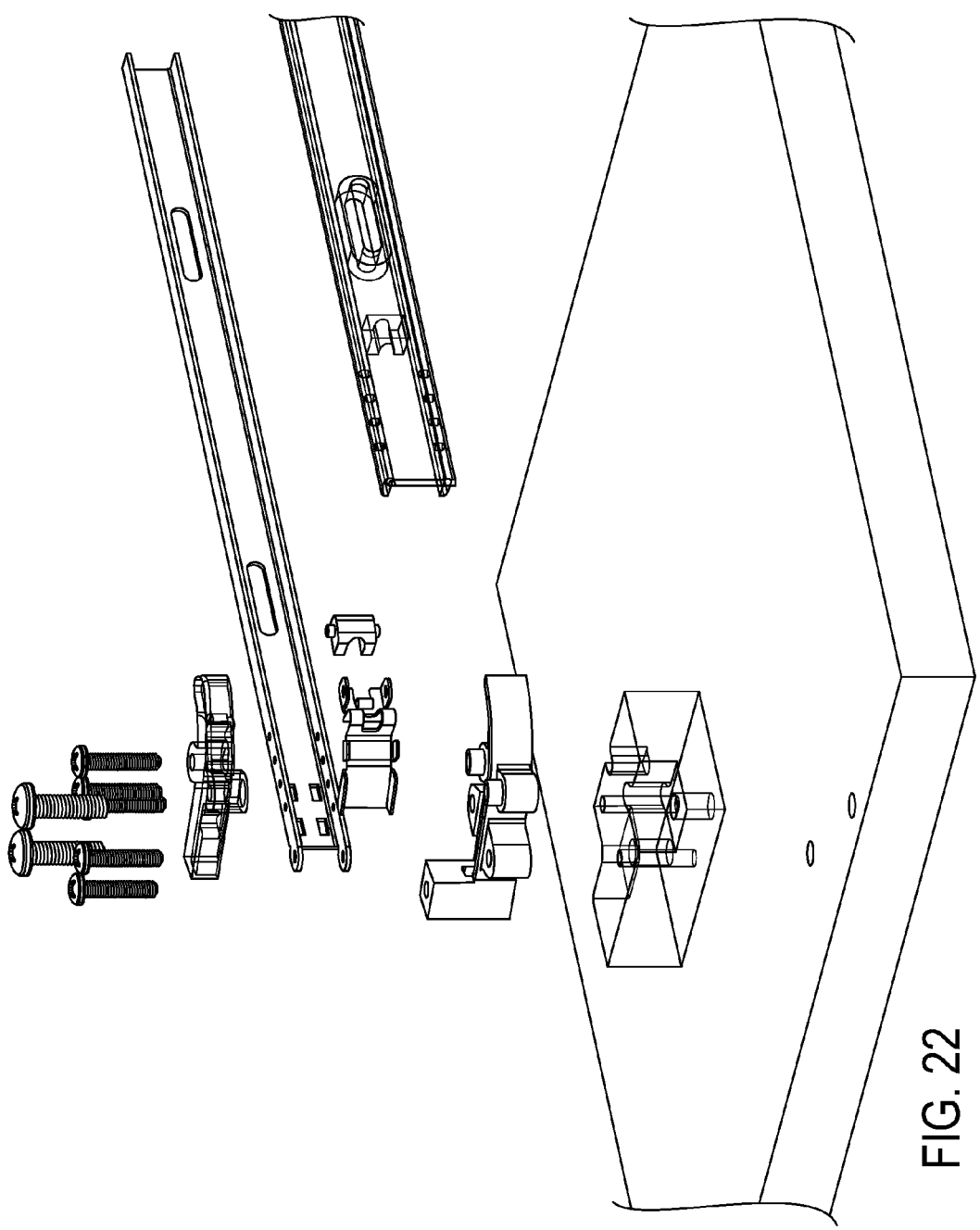
FIG. 22 illustrates an exploded view of a sheet metal spring hinge embodiment.

FIG. 22 illustrates an exploded view of a sheet metal spring hinge above a breadboard, according to an embodiment of the present invention.

Figure 23:
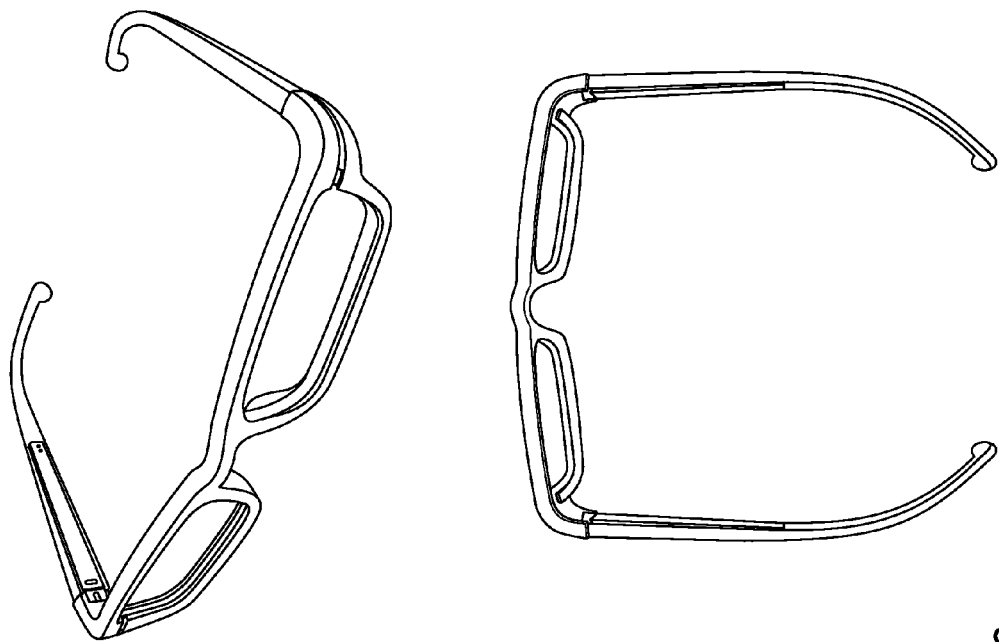
FIG. 23 shows multiple views of an assembled pair of eyeglasses, according to an embodiment.
Figure 23:
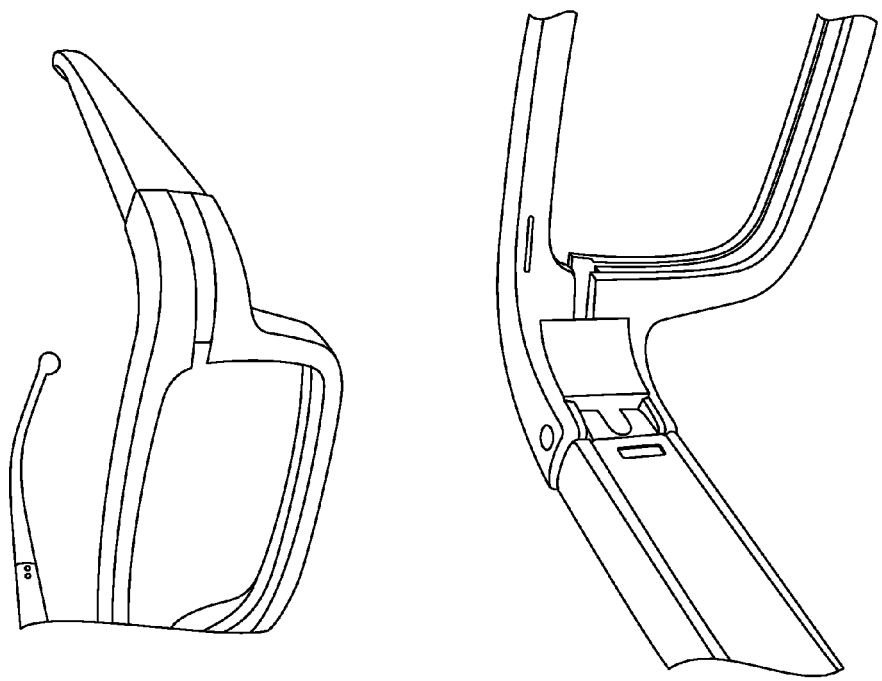

FIG. 23 shows several views of an assembled embodiment of a pair of eyeglasses from different perspectives that includes a spring in accordance with an embodiment of the present invention.

Materials

The pieces of the various actuator assemblies described herein, for example, but not limited to, the temple cover, temple chassis, wheel, slider, spring, screws, inner block, outer block, axle, compression arm, spacer block, etc, may be manufactured through any suitable process, such as metal injection molding (MIM), cast, machining, plastic injection molding, and the like. The choice of materials may be further informed by the requirements of, for example and without limitation, mechanical properties, temperature sensitivity, optical properties such as dispersion, moldability properties, or any other factor apparent to a person having ordinary skill in the art.

The fluid used in the fluid lens may be a colorless fluid; however, other embodiments include fluid that is tinted, depending on the application, such as if the intended application is for sunglasses. One example of fluid that may be used is manufactured by Dow Corning of Midland, Mich., under the name "diffusion pump oil," which is also generally referred to as "silicone oil."

The fluid lens may include a rigid optical lens made of glass, plastic, or any other suitable material. Other suitable materials include, for example and without limitation, Diethylglycol bisallyl carbonate (DEG-BAC), poly(methyl methacrylate), PMMA and a proprietary polyurea complex, trade name TRIVEX (PPG).

The fluid lens may include a membrane made of a flexible, transparent, water impermeable material, such as, for example and without limitation, clear and elastic polyolefins, polycycloaliphatics, polyethers, polyesters, polyimides and polyurethanes, for example, polyvinylidene chloride films, including commercially available films, such as those manufactured as MYLAR or SARAN. Other polymers suitable for use as membrane materials include, for example and without limitation, polysulfones, polyurethanes, polythiourethanes, polyethylene terephthalate, polymers of cycloolefins and aliphatic or alicyclic polyethers.

The connecting tube may be made of one or more materials such as TYGON (polyvinyl chloride), PVDF (Polyvinyledene fluoride), and natural rubber. For example, PVDF (such as heat-shrunk flexible PVDF) may be suitable based on its durability, permeability, and resistance to crimping. In addition The temple cover may be any suitable shape, and may be made of plastic, metal, or any other suitable material. In an embodiment, the temple cover is made of a lightweight material such as, for example and without limitation, high impact resistant plastics material, aluminum, titanium, or the like. In an embodiment, the temple cover may be made entirely or partly of a transparent material.

The reservoir may be made of Polyvinyledene Difluoride, such as Heat-shrink VITON®, supplied by DuPont Performance Elastomers LLC of Wilmington, Del., DERAY-KYF 190 manufactured by DSG-CANUSA of Meckenheim, Germany (flexible), RW-175 manufactured by Tyco Electronics Corp. of Berwyn, Pa. (formerly Raychem Corp.) (semirigid), or any other suitable material.

The screws used in the frame assembly may include, for example and without limitation, Visottica 07V120037017 shoulder screws produced by Visottica Industrie S.P.A. of Susegana, Italy. Other suitable types of screws or other attachment means, such as rivets, may be used.

Although various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

We claim:

1. A fluid-filled lens assembly comprising:
a temple arm;
a reservoir;
a fluid-filled lens within a frame;
a tube for passing fluid connecting the reservoir to the fluid-filled lens; and
a hinge having a first end for connecting to the temple arm and a second end for connecting to the frame,
wherein the hinge includes a gap that is shaped to allow the tube for passing fluid to pass from the first end to the second end,
wherein the gap allows the tube to bend without kinking when the temple arm is rotated, and
wherein the hinge includes a peaked surface capable of engaging a rounded surface of the temple arm when the temple arm is rotated a first predetermined distance to create spring energy in the hinge that resists further rotation of the temple arm.

2. The fluid-filled lens assembly of claim 1, wherein the gap allows the tube to bend without kinking when the temple arm is rotated between an open position in which the temple arm is substantially perpendicular to the frame and a closed position in which the temple arm is substantially parallel to the frame.

3. The fluid-filled lens assembly of claim 1, wherein the peaked surface is capable of releasing the spring energy in the hinge to accelerate the temple arm when the temple arm is rotated a second predetermined distance beyond the first predetermined distance.

4. The fluid-filled lens assembly of claim 1, further comprising a hard stop to prevent rotation beyond a point.

5. The fluid-filled lens assembly of claim 1, wherein the hinge is at least partially contained within the temple arm.

6. The fluid-filled lens assembly of claim 1, wherein the gap allows the tube to bend without kinking when the temple arm is rotated between a first position and a second position.

7. A fluid-filled lens assembly comprising:
a temple arm;
a reservoir;
a fluid-filled lens within a frame;
a tube for passing fluid connecting the reservoir to the fluid-filled lens; and
a hinge including a first end for connecting to the temple arm and a second end for connecting to the frame,
wherein the hinge includes a gap that is shaped to allow the tube for passing fluid to pass from the first end to the second end of the hinge,
wherein the gap has a size that allows the tube to bend without kinking when the temple arm is rotated between an open position in which the temple arm is substantially perpendicular to the frame and a closed position in which the temple arm is substantially parallel to the frame,
wherein the hinge includes a peaked surface capable of engaging a rounded surface of the temple am when the temple arm is rotated a first predetermined distance to create spring energy in the hinge that resists further rotation of the temple arm, and
wherein the peaked surface is capable of releasing the spring energy in the hinge to accelerate the temple arm when the temple arm is rotated a second predetermined distance beyond the first predetermined distance.

* * * * *